(12) United States Patent
Chen et al.

(10) Patent No.: US 9,338,293 B2
(45) Date of Patent: *May 10, 2016

(54) COMMUNICATION DEVICE AND COMMUNICATION METHOD THEREOF

(71) Applicant: HON HAI PRECISION INDUSTRY CO., LTD., New Taipei (TW)

(72) Inventors: Yi-Chao Chen, New Taipei (TW); Jin-Hau Kuo, New Taipei (TW); Chung-Hsuan Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 54 days.

This patent is subject to a terminal disclaimer.

(21) Appl. No.: 13/832,037

(22) Filed: Mar. 15, 2013

(65) Prior Publication Data

US 2013/0202096 A1 Aug. 8, 2013

Related U.S. Application Data

(62) Division of application No. 12/650,794, filed on Dec. 31, 2009, now Pat. No. 8,433,049.

(30) Foreign Application Priority Data

Sep. 22, 2009 (CN) .......................... 2009 1 0307452

(51) Int. Cl.
*H04M 3/44* (2006.01)
*H04M 1/2745* (2006.01)
*H04M 1/57* (2006.01)

(52) U.S. Cl.
CPC ............ *H04M 3/44* (2013.01); *H04M 1/27455* (2013.01); *H04M 1/576* (2013.01)

(58) Field of Classification Search
CPC .... H04M 1/27455; H04M 3/44; H04M 1/576
USPC ........ 379/90.01, 93.05, 88.01–88.23, 142.09, 379/355.01; 348/14.01–14.03
See application file for complete search history.

(56) References Cited

U.S. PATENT DOCUMENTS

| 8,295,819 | B1 * | 10/2012 | Kaplan et al. ................. 455/415 |
| 2004/0048633 | A1 * | 3/2004 | Sato et al. ................. 455/556.1 |
| 2005/0273494 | A1 * | 12/2005 | Uchide ......................... 709/204 |
| 2006/0258388 | A1 * | 11/2006 | Sato ...................... H04M 1/575 455/550.1 |
| 2007/0086773 | A1 * | 4/2007 | Ramsten et al. ............. 396/287 |
| 2007/0268309 | A1 * | 11/2007 | Tanigawa et al. ............ 345/619 |

(Continued)

FOREIGN PATENT DOCUMENTS

JP 2007028077 A * 2/2007

*Primary Examiner* — Melur Ramakrishnaiah

(74) *Attorney, Agent, or Firm* — Novak Druce Connolly Bove + Quigg LLP

(57) ABSTRACT

A communication device provides a face detection module and a face recognition module. The face detection module detects faces in a photo input by a user. The face recognition module searches the detected faces in a storage system of the communication device. If the detected faces do not exist in the storage system, the communication device prompts the user to edit communication information of the detected faces. If the user wants to dial a phone number, the communication device searches the storage system for the phone number of a selected face in a photo and dials the phone number. If a phone number is calling in, the communication device displays a photo corresponding to the phone number, and highlights a face corresponding to the phone number.

16 Claims, 5 Drawing Sheets

(56) References Cited

U.S. PATENT DOCUMENTS

2008/0100693 A1* 5/2008 Jobs .................... H04M 1/576
348/14.07
2009/0006484 A1* 1/2009 Wang ................ G06F 17/30247
1/1
2009/0087102 A1* 4/2009 Lee ............................ 382/195
2011/0034156 A1* 2/2011 Gatti .................. H04M 1/2745
455/415

* cited by examiner

COMMUNICATION DEVICE AND COMMUNICATION METHOD THEREOF

CROSS-REFERENCE TO RELATED APPLICATIONS

This application is a divisional of U.S. application Ser. No. 12/650,794, entitled "COMMUNICATION DEVICE AND COMMUNICATION METHOD THEREOF", filed on Dec. 31, 2009, published as US20110069823A1, which is based upon and claims the benefit of priority from Chinese Patent Application No. 200910307452.3, filed Sep. 22, 2009 in the People's Republic of China. The entirety of each of the above-mentioned patent applications is hereby incorporated by reference herein in its entirety.

BACKGROUND

1. Technical Field

Embodiments of the present disclosure relate to communication, and more particularly to a communication device and communication method thereof.

2. Description of Related Art

At present, if a user wants to dial a phone number that they cannot recall from memory, the user needs to search through a contact list. If the user cannot remember the contact name then they are out of luck.

What is needed, therefore, is an improved communication device and communication method.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
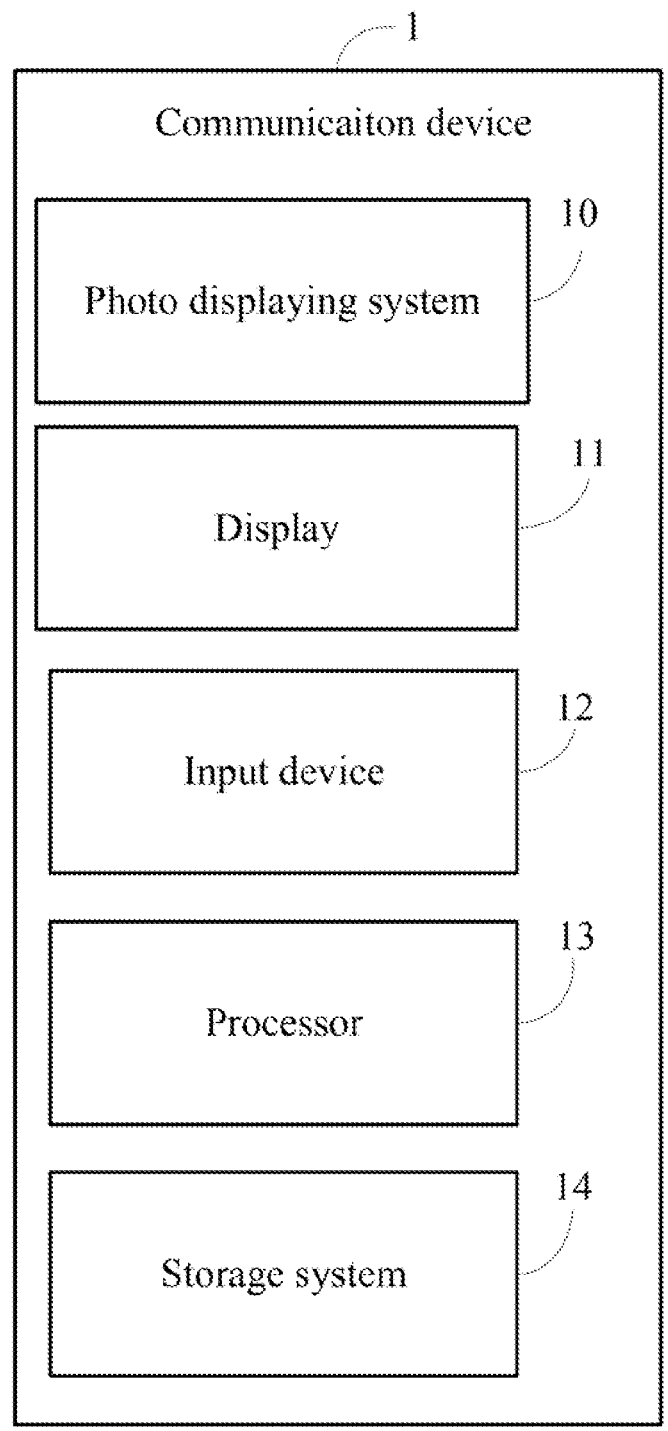
FIG. 1 is a block diagram of one embodiment of a communication device comprising a photo displaying system.

FIG. 1 is a block diagram of one embodiment of a communication device 1 comprising a photo displaying system 10. The photo displaying system 10 may be used to display photos associated with known incoming call numbers or numbers being dialed according to features in the photos. In one embodiment, the features may be, but not limited to, facial features in the photos. The communication device 1 includes a display 11 and an input device 12. In one embodiment, the display 11 may be a touch panel. In another embodiment, the display 11 may be electronically connected to the communication device 1. The input device 12 may be used to receive input actions of the user, for example, the user may select a photo corresponding to a phone number that the user wants to dial. In one embodiment, the input device 12 may be mechanical keys or a stylus corresponding to the touch panel. The communication device 1 may be a telephone.

The communication device 1 includes a processor 13 and a storage system 14. The processor 13 executes one or more computerized operations of the computer 1 and other applications, to provide the functions of the computer 1. The storage system 14 stores one or more programs, such as programs of an operating system, other applications of the communication device 1, and various kinds of data, such as function settings of the communication device 1, a short message application, or E-mails, for example. The storage system 14 stores a plurality of photos and features of the plurality of photos. In one embodiment, the storage system 14 may store facial features of recognized faces in the plurality of photos, each of the recognized faces corresponding to a photo number. In one embodiment, the facial features may include facial position, expression, locations of eyes, nose and mouth, etc. The storage system 14 also stores communication information corresponding to each face. In one embodiment, the communication information may include a phone number and a contact name stored in a contact list of the communication device 1, for example.

Figure 2:
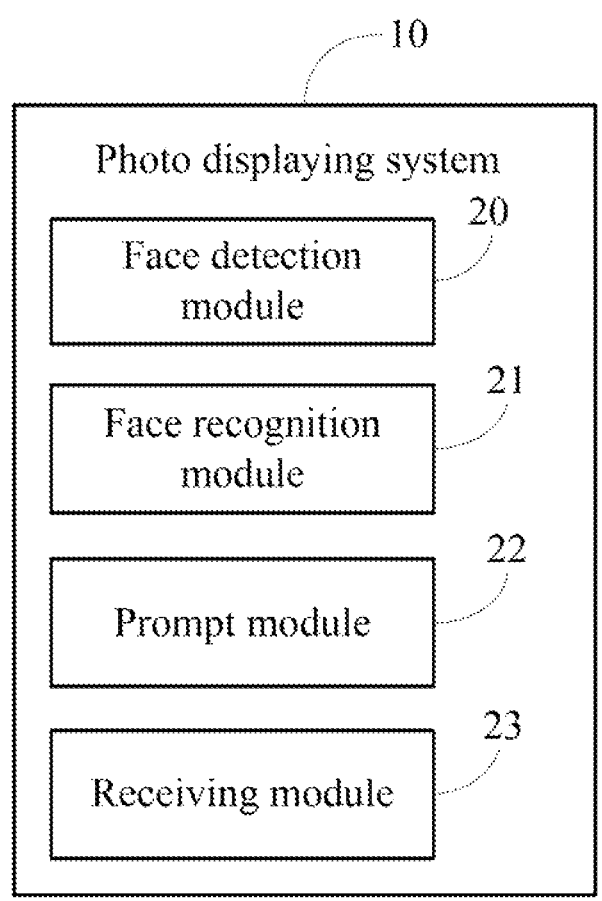
FIG. 2 is a block diagram of one embodiment of functional modules of the photo displaying system in FIG. 1.

FIG. 2 is a block diagram of functional modules of the photo displaying system 10 in FIG. 1. In one embodiment, the photo displaying system 10 may include a face detection module 20, a face recognition module 21, a prompt module 22, and a receiving module 23. It may be understood that the processor 13 may be used to execute one or more computerized codes of the functional modules 20-23. The one or more computerized codes of the functional modules 20-23 may be stored in the storage system 14.

The face detection module 20 detects faces in a photo input by the user.

The face recognition module 21 recognizes facial features of the detected faces, and then searches the storage system 14 for the detected faces. In one example, the facial features may include sizes of various facial components, such as eyes, nose, and mouth and distances between these facial components. As mentioned above, the storage system 14 stores facial features of a plurality of specified faces. The face recognition module 21 detects if the recognized facial features already exist in the storage system 14 by comparing the recognized facial features with the stored facial features.

If the detected faces do not exist in the storage system 14, the prompt module 22 prompts the user to edit communication information of the detected faces. In one embodiment, the prompt module 22 highlights the detected faces in the photo, such as enhancing brightness of the detected faces, for example.

The receiving module 23 stores the recognized facial features and edited communication information into the storage system 14.

If the user wants to dial a phone number, the receiving module 23 receives a photo selected from the storage system 14 or an external device, such as a camera module, for example. The face detection module 20 detects faces in the selected photo. The receiving module 23 displays the selected photo on the display 11. If the user selects a face in the selected photo, the receiving module 23 determines the selected face from the detected faces in response to receiving a selection signal.

The face recognition module 21 recognizes facial features of the selected face, and searches the storage system 14 for the selected face according to the recognized facial features of the selected face. The receiving module 23 searches the storage system 14 for a phone number corresponding to the selected face. In one embodiment, if the selected face corresponds to a plurality of phone numbers in the storage system 14, the user may select the phone number on the display 11 by using the input device 12.

When a call is received, the receiving module 23 determines a phone number of the call, and searches the storage system 14 for a photo and a face corresponding to the phone number. If the photo and the face corresponding to the phone number are found, the prompt module 22 displays the found photo on the display 11 and highlights the face corresponding to the phone number. If the call goes unanswered, then the prompt module 22 also displays the phone number as well as the highlighted photo on the display 11 until, for example, another call comes in or a user resets the display. If the photo and the face corresponding to the phone number are not found, the prompt module 22 displays the phone number on the display 11 and prompts that there is no photo corresponding to the phone number.

Figure 3:
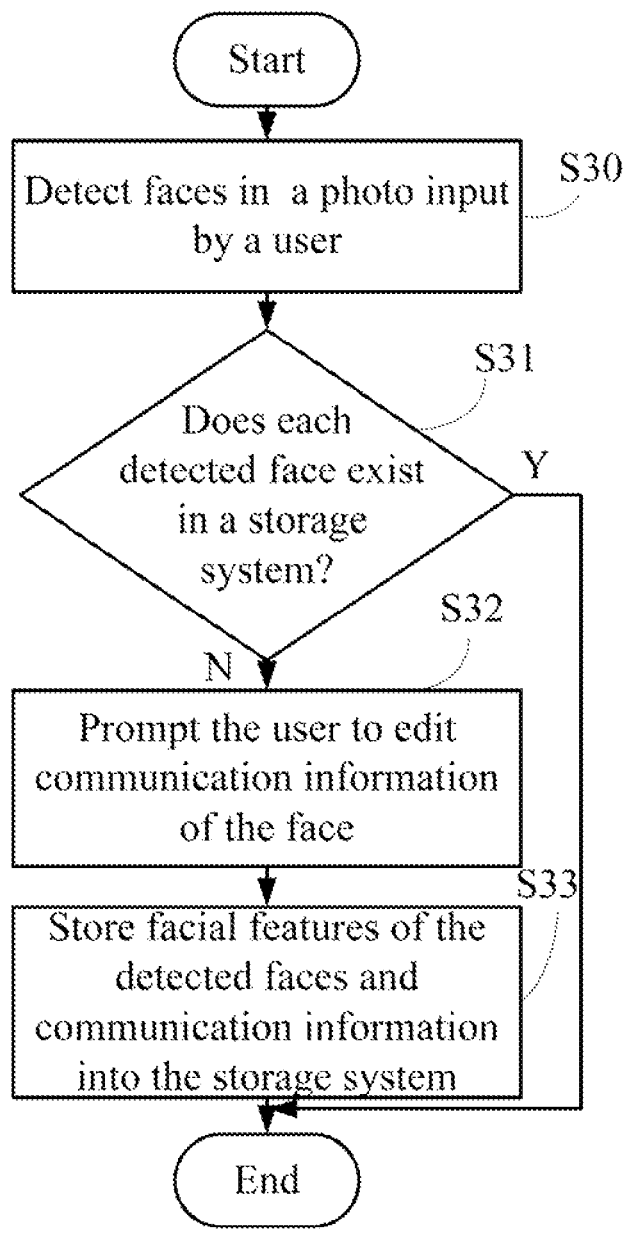
FIG. 3 is a flowchart of one embodiment of a method for storing communication information.

FIG. 3 is a flowchart of one embodiment of a method for storing communication information. Depending on the embodiment, additional blocks may be added, others removed, and the ordering of the blocks may be changed.

In block S30, the face detection module 20 detects faces in a photo input by the user.

In block S31, the face recognition module 21 recognizes facial features of the detected faces, and then searches the storage system 14 for the detected faces to detect if the detected faces exist in the storage system 14. If the detected faces exist in the storage system 14, the procedure ends. If there any detected faces do not exist in the storage system 14, block S32 is implemented.

In block S32, the prompt module 22 prompts the user to edit communication information of the detected faces that have not been searched in the storage system 14.

In block S33, the receiving module 22 stores the recognized facial features and edited communication information into the storage system 14.

Figure 4:
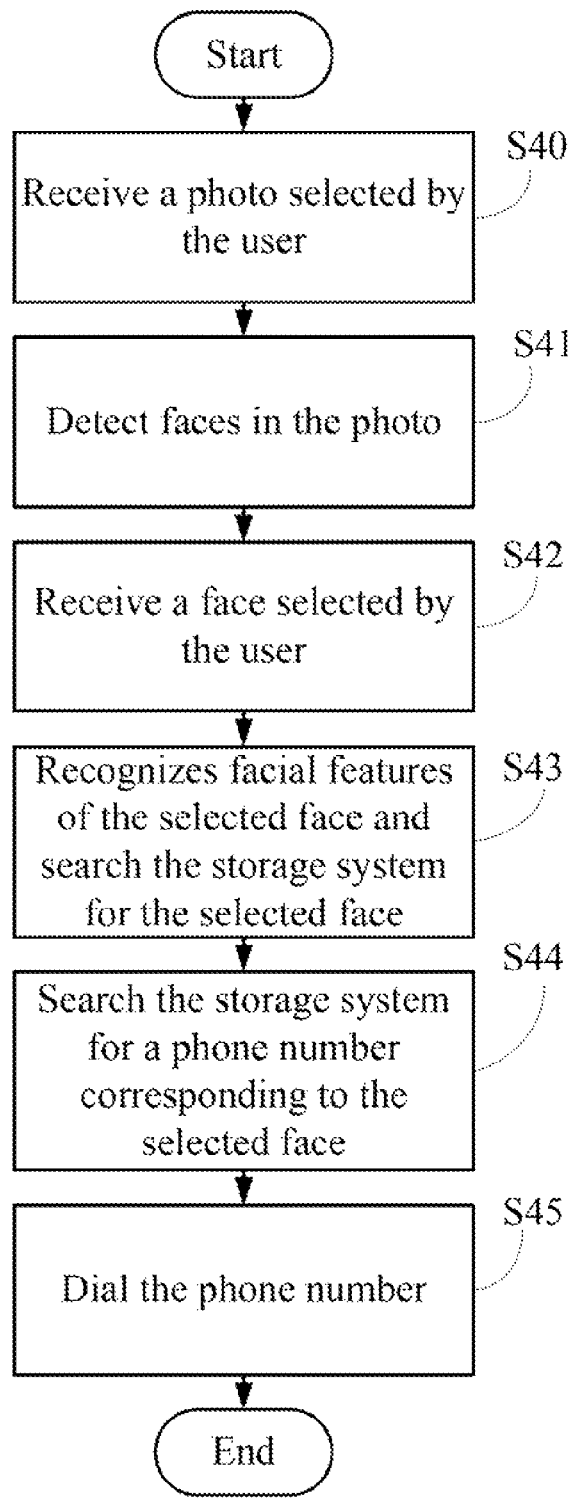
FIG. 4 is a flowchart of one embodiment of a method for dialing a phone number.

FIG. 4 is a flowchart of one embodiment of a method for dialing a phone number. Depending on the embodiment, additional blocks may be added, others removed, and the ordering of the blocks may be changed.

In block S40, the receiving module 23 receives a photo selected from the storage system 14 and displays the selected photo.

In block S41, the face detection module 20 detect faces in the selected photo.

In block S42, the receiving module 23 determines a selected face from the detected faces in response to receiving a selection signal.

In block S43, the face recognition module 21 recognizes facial features of the selected face, and searches the storage system 14 for the selected face according the recognized facial features of the selected face.

In block S44, the receiving module 23 searches the storage system 14 for a phone number corresponding to the selected face.

In block S45, the receiving module 23 dials the phone number.

Figure 5:
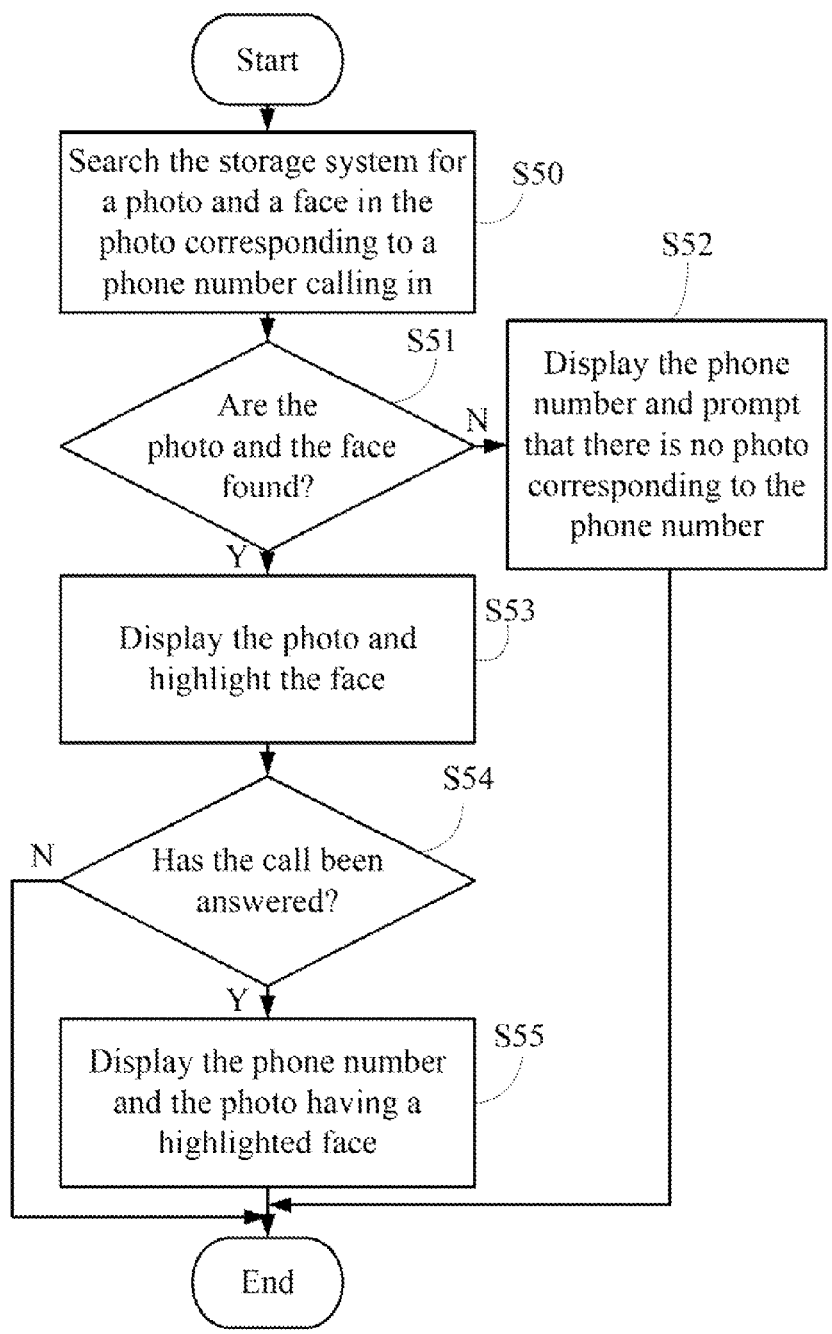
FIG. 5 is a flowchart of one embodiment of a method for receiving a call.

FIG. 5 is a flowchart of one embodiment of a method for receiving a call. Depending on the embodiment, additional blocks may be added, others removed, and the ordering of the blocks may be changed.

When a call is received, in block S50, the receiving module 23 determines a phone number of the call, and searches the storage system for a photo and a face in the photo corresponding to the phone number.

In block S51, the receiving module 23 detects if the photo and the face corresponding to the phone number are found in the storage system 14. If the photo and the face are not found in the storage system 14, in block S52, the prompt module 22 displays the phone number on the display 11 and prompts that there is no photo corresponding to the phone number, and the procedure ends. If the photo and the face corresponding to the phone number are found, block S53 is implemented.

In block S53, the prompt module 22 displays the searched photo on the display 11 and highlights the face.

In block S54, the prompt module 22 detects if the call has been answered. If the call goes unanswered, block S55 is implemented. If the call has been answered, the procedure ends.

In block S55, the prompt module 22 displays the phone number and the photo having a highlighted face on the display 11.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A communication device, comprising:
a storage system operable to store one or more photos;
a display operable to display a first photo retrieved from a photo source;
at least one processor to execute one or more programs stored in the storage system, the one or more programs comprising:
a face detection module operable to detect faces in the displayed first photo;
a prompt module operable to prompt to edit communication information of each of the detected faces through the display;
a receiving module operable to store the communication information of each of the detected faces to associate each of the detected faces with an instance of the communication information; and
a face recognition unit operable to recognize a selected face in a selected photo before association of any of the communication information with the selected photo, search a set of photos based on the selected face before association of any of the communication information with the selected face to locate the first photo among the set of photos and to locate a processed face among the detected faces in the first photo in response to a first operation associated with the selected face;
wherein the receiving module is further operable to initiate a communication according to an instance of the communication information associated with the processed face in the detected faces in the displayed first photo in response to a second operation associated with the selected face.

2. The communication device of claim 1, wherein the receiving module is further operable to determine a phone number of a received call, and search the storage system for a photo and a face associated with the phone number of the received call.

3. The communication device of claim 2, wherein the prompt module is further operable to display the photo associated with the phone number of the received call on the display and highlight the face associated with the phone number of the received call if the searching finds the photo and the face associated with the phone number of the received call.

4. The communication device of claim 1, wherein the instance of the communication information comprises a contact name.

5. The communication device of claim 1, wherein the instance of the communication information comprises a communication identifier.

6. The communication device of claim 5, wherein the instance of the communication information comprises a phone number.

7. The communication device of claim 5, wherein if the processed face is associated with a plurality of instances of the communication information, the communication device further comprises a touch device associated with the display, operable to receive selection of one of the plurality of instances of the communication information associated with the processed face to initiate a communication.

8. The communication device of claim 1, wherein the receiving module is further operable to receives the first photo through a camera function.

9. The communication device of claim 1, wherein the communication device comprises a telephone.

10. The communication device of claim 1, wherein the selected photo comprises a plurality of faces, and the selected face is one of the plurality of faces in the selected photo.

11. A communication method, comprising:
retrieving a first photo;
displaying the first photo through a display function;
detecting faces in the first photo;
prompting to edit communication information of each of the detected faces through the display function;
storing the communication information of each of the detected faces to associate each of the detected faces with an instance of the communication information;
recognizing a selected face in a selected photo before association of any of the communication information with the selected photo;
searching in a set of photos based on the selected face before association of any of the communication information with the selected face to locate the first photo among the set of photos and to locate a processed face among the detected faces in the first photo in response to a first operation association with the selected face; and
initiating a communication according to an instance of the communication information associated with the processed face in the detected faces in the first photo in response to a second operation associated with the selected face.

12. The communication method of claim 11, wherein the method further comprises:
determining a phone number of a received call;
searching the set of photos for a photo and a face associated with the phone number of the received call; and
displaying the photo associated with the phone number of the received call and highlighting the face associated with the phone number of the received call if the searching locates the photo and the face associated with the phone number of the received call.

13. The communication method of claim 10, wherein the selected photo comprises a plurality of faces, and the selected face is one of the plurality of faces in the selected photo.

14. A non-transitory computer readable medium having stored therein instructions that, when executed by a communication device, causes the communication device to perform a communication method comprising:
displaying a first photo selected from a photo source through a display function;
detecting faces in the first photo;
prompting to edit communication information of each of the detected faces through the display function;
storing the communication information of each of the detected faces to associate each of the detected faces with an instance of the communication information; and
recognizing a selected face in a selected photo before association of any of the communication information with the selected photo;
searching in a set of photos based on the selected face before association of any of the communication information with the selected face to locate the first photo among the set of photos and to locate a processed face among the detected faces in the first photo in response to a first operation associated with the selected face; and
initiating a communication according to an instance of the communication information associated with the processed face in the detected faces in the first photo in response to a second operation associated with the selected face.

15. The non-transitory computer readable medium of claim 14, wherein the communication method further comprises:
determining a phone number of a received call;
searching the set of photos for a photo and a face associated with the phone number of the received call; and
displaying the photo associated with the phone number of the received call and highlighting the face associated with the phone number of the received call if the searching locates the photo and the face associated with the phone number of the received call.

16. The non-transitory computer readable medium of claim 14, wherein the selected photo comprises a plurality of faces, and the selected face is one of the plurality of faces in the selected photo.

* * * * *